No. 891,600. PATENTED JUNE 23, 1908.
C. A. DAVIS.
MEANS FOR ATTACHING CROWNS TO ROOTS OF TEETH.
APPLICATION FILED OCT. 23, 1907.
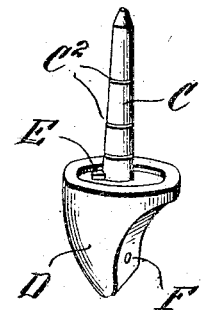
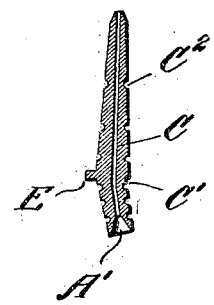
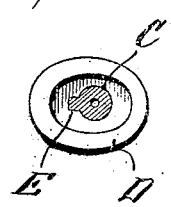
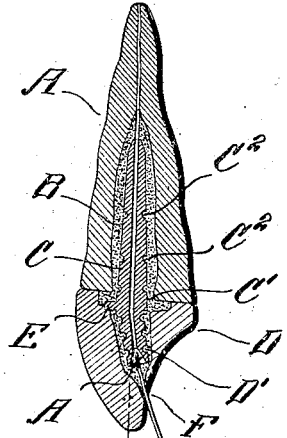
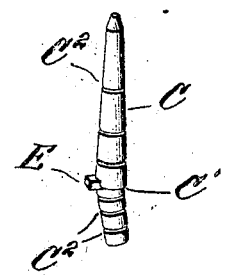

UNITED STATES PATENT OFFICE.

CHARLES A. DAVIS, OF PASADENA, CALIFORNIA.

MEANS FOR ATTACHING CROWNS TO ROOTS OF TEETH.

No. 891,600.　　　　Specification of Letters Patent.　　　　Patented June 23, 1908.

Application filed October 23, 1907. Serial No. 398,829.

*To all whom it may concern:*

Be it known that I, CHARLES A. DAVIS, a citizen of the United States, residing at Pasadena, in the county of Los Angeles and State of California, have invented certain new and useful Improvements in Means for Attaching Crowns to Roots of Teeth; and I do hereby declare the following to be a full, clear, and exact description of the invention, such as will enable others skilled in the art to which it appertains to make and use the same, reference being had to the accompanying drawings and to the letters and figures of reference marked thereon, which form a part of this specification.

This invention relates to new and useful improvements in means for attaching crowns to the roots of teeth and so arranged that access may be readily had to the canal cavity of the root, in the event of it being desired to treat the root, and comprises essentially a hollow tubular pin adapted to be securely anchored in alinement with the root canal, and being slightly inclined, in order to allow the cutting edge of the crown of the tooth to be in axial alinement with the root canal and the palatal cavity in the side of the crown is so arranged that an instrument may be conveniently inserted and passed through the angular passageway in the pin.

Heretofore attempts have been made to utilize tubular pins for anchoring crowns to the roots of teeth and in all instances the crown has been cut away throwing the bite of the crown at one side of the axial center of the root, this being necessary in such cases in order to have access to the straight tubular pin so adjusted, and which is an objection, as the usual pressure coming upon an abnormal placed crown has the tendency to loosen the same from the pin or root.

Another feature of the present invention comprises an angular tubular pin designed to connect a crown to the root of a tooth, the opening in one end of the pin which is positioned in the crown being flaring, in order to facilitate the insertion of a drill or other instrument for the treatment or excavation of the root canal.

A still further feature of the present invention comprises a tubular angular pin having a lateral projection thereon, designed to hold the pin from a rotary movement when cemented upon the crown and root.

The invention comprises various details of construction which will be hereinafter fully described and then specifically defined in the appended claims.

I illustrate my invention in the accompanying drawings, in which:—

Figure 1 is a perspective view of a tooth crown provided with my improvement. Fig. 2 is a central vertical section of the crown and root, showing the means employed in treating the root. Fig. 3 is a central vertical section of the hollow tooth pin. Fig. 4 is a perspective view of the pin, and Fig. 5 is a top plan view of the crown with the pin removed.

Reference now being had to the details of the drawings by letter, A designates the root of a tooth having the usual canal cavity B, and C is a tubular pin which is bent at C' at a slight angle and the outer surface of said pin is provided with grooves or threads $C^2$ whereby the same may be securely held by cement to the root of the tooth.

D designates the crown of a tooth, one end of which, where it is to join the end of the root, is preferably recessed slightly to receive a laterally projecting lug E upon the pin, which serves to prevent the crown from having an axial movement independent of the pin. Said crown has a recess D' which inclines slightly to conform to the inclination of the portion of the pin which is seated therein, and said recess has an opening F through the wall thereof and through which access may be had to said tubular pin. It will be noted that the opening A' into the end of the pin, which engages said crown, is flaring in order to facilitate the insertion of an instrument into the opening extending through the pin, whereby access may be had to the canal cavity for the purpose of treating the same, if desired. In adjusting the pin, one end of the pin is first inserted in the recess in the crown in the manner shown and the other end of the pin inserted in the canal cavity of the root and securely cemented and anchored, which cement engages the threads or grooves in the circumference of the pin. The laterally projecting lug upon the pin engaging the recess in the end of the crown and securely cemented therein will serve to prevent the pin and crown from having independent axial movements. After the cement is thoroughly set, the entrance into the tubular pin may be closed by any suitable filling, which may be readily removed by proper instruments whenever it may be desired to have access to the cavity of the root for treatment or for any other purpose.

It will be noted that, by the provision of an angular, tubular pin for connecting crowns to the roots of teeth, the minute pliable instrument may be readily inserted through the opening in the crown and passed into and through the tubular pin without any interference with the cutting edge of the crown which, at all times, is held in its natural position with its end in axial alinement with the root canal. It will also be noted that the palatine opening in said crown, as shown at F, is larger internally than at its mouth, for the purpose that the cavity may be more securely filled with cement or gold, when required.

What I claim to be new is:—

1. An angular, tubular pin for connecting a crown to the root of a tooth, affording means for access to the canal cavity of the root, as set forth.

2. An angular, tubular pin for connecting a crown to the root of a tooth, the opening in the crown engaging end of the pin being flaring, as set forth.

3. An angular, tubular pin for connecting a crown to the root of a tooth, said pin having a lateral projection and adapted to hold a crown from having a movement independent of the pin when held to the root of a tooth, as set forth.

4. In combination with the root of a tooth, an angular, tubular pin, one end of which is seated in the canal cavity of the root, a crown having a cavity in which the other end of the pin is positioned, said crown having an opening in the wall thereof in registration with the passageway through said pin, and means for preventing the crown from having an axial movement independent of the pin, as set forth.

5. In combination with the root of a tooth, an angular, tubular pin having a portion thereof seated in the canal of the root and provided with a lateral projection, a crown having an inclined cavity therein for the reception of one end of said pin, a recess for the reception of said lateral projecting portion of the pin, the palatine surface of the crown having an opening in registration with the passageway through said pin, as set forth.

In testimony whereof I hereunto affix my signature in the presence of two witnesses.

CHARLES A. DAVIS.

Witnesses:
A. L. HOUGH,
FRANKLIN H. HOUGH.